United States Patent [19]
Fiorenzo

[11] 3,757,316
[45] Sept. 4, 1973

[54] ALARM ASSEMBLY COMBINED WITH CLEANOUT PLUG STRUCTURE

[76] Inventor: Joseph Fiorenzo, 82 Saw Mill Rd., North Haledon, N.J. 07508

[22] Filed: Feb. 23, 1972

[21] Appl. No.: 228,549

[52] U.S. Cl. ............................ 340/243, 340/244 C
[51] Int. Cl. ........................................... G08b 21/00
[58] Field of Search.................... 340/244, 243, 245; 200/84

[56] References Cited
UNITED STATES PATENTS

| | | | |
|---|---|---|---|
| 2,761,037 | 8/1956 | Thomas et al. | 340/243 X |
| 1,164,882 | 12/1915 | Sommer | 340/243 |
| 3,069,671 | 12/1962 | Taylor | 340/244 C |
| 3,341,836 | 9/1967 | Marcum | 340/244 C |
| 2,613,293 | 10/1952 | Marks | 340/244 E X |
| 3,498,131 | 3/1970 | Rickey | 340/244 C X |
| 3,312,936 | 4/1967 | Huntzinger | 340/244 C X |

FOREIGN PATENTS OR APPLICATIONS 1,609,195   12/1969   Germany ........................... 340/245

*Primary Examiner*—John W. Caldwell
*Assistant Examiner*—Daniel Myer
*Attorney*—Stefan J. Klauber

[57] ABSTRACT

An alarm assembly for replacing the cleanout plug in a sewer outlet conduit. The assembly is a caplike structure dimensioned for replacing the said cleanout plug, and carries external threads adapted to mate with the threads in a cleanout opening at the sewer outlet. Water responsive means, such as a float or water activated probes, are mounted in the structure and arranged to sense presence of water at the end thereof facing inwardly of the sewer opening when the structure is emplaced at the sewer conduit.

5 Claims, 4 Drawing Figures

PATENTED SEP 4 1973 3,757,316

ALARM ASSEMBLY COMBINED WITH CLEANOUT PLUG STRUCTURE

BACKGROUND OF INVENTION

This invention relates generally to condition responsive alarm systems, and more specifically relates to a system providing an alarm indication upon a blockage condition existing in the sewer outlet conduit of a dwelling or business property.

The maintenance of normal sewer drainage from a residence or other building, is an essential condition for the convenience, not to mention the health and well-being, of the inhabitants. Typically, the home-owner will seldom be consciously aware of the importance of such drainage, but upon the occurrence of a blockage, normal activities in the home virtually cease until the condition is rectified. Unfortunately, the awareness of an impediment to sewage outflow does not usually occur until the condition becomes so acute that complete backup ensues —with flooding and related inconvenience and stress occurring at the said dwelling.

In recognition of the foregoing problem, various proposals have been made in the past, intended to provide apparatus which in one way or another, signals the dwelling owner of a blockage condition in the outlet sewer conduit. In the great bulk of instances, these prior proposals have been less than satisfactory —as is witnessed by the observable fact that the great majority of dwellings are not actually equipped with devices capable of providing advance warning.

Such prior devices have failed to find widespread public acceptance for a number of reasons. A principal explanation has been that such prior devices were overly complex and expensive; and more importantly, were not usually installable by simple techniques. In particular, many of these prior devices necessitated installation by a skilled plumber and/or electrician or other artisans, in consequence of which, the average home-owner, rather than invest comparatively large monetary amounts, has been willing —often to his detriment— to accept the risks that might occur from not possessing such a warning system.

Yet another shortcoming that may be noted in connection with many of the prior devices of the art, was that such apparatus were often so designed that an incipient sewer problem was unlikely to be brought to the attention of the dwelling owner. Typically the systems so functioned that the owner would be apprised of the problem only where such problem had become sufficiently acute so as to produce a virtually complete blockage in the sewer. Hence, the owner was not afforded by such prior devices, an opportunity to alleviate a developing problem before a more serious degree of blockage occurred.

In accordance with the foregoing, it may be regarded as an object of the present invention, to provide an alarm system for indicating deteriorating flow conditions in a sewer conduit, which is of simple, dependable, and economical design, and which is readily installed in the plumbing systems of homes or the like, without modification of the existing plumbing system, and by unskilled persons using only the common tools available in the home.

It is a further object of the present invention, to provide an alarm system which is readily installed at the existing plumbing of homes or business buildings, which is completely self-contained, and which is capable of providing an alarm indication under incipient blockage conditions, whereby the dwelling owner may be apprised of a developing problem before an acute stage of blockage occurs.

It is a still further object of the present invention, to provide a liquid responsive alarm system, which while being particularly adapted for use as a sewer alarm, may be placed directly on flat surfaces or the like, enabling its use as a water detector in basements or so forth; and which further includes simple means enabling a user to convert the device for use as an overflow alarm in tubs, basins, or the like.

SUMMARY OF INVENTION

Now in accordance with the present invention, the foregoing objects, and others as will become apparent in the course of the ensuing specification, are achieved in an alarm assembly comprising a caplike structure adapted for replacing the conventional cleanout plug present in the sewer outlet conduit of homes or similar dwellings or business buildings. The said caplike structure carries external threads adapted to mate with threads in the cleanout opening of the said sewer conduit. Water responsive means are mounted in the cap structure and include a water sensor at the end of the structure facing inwardly of the sewer opening when the structure is emplaced at the sewer conduit. An alarm indicator such as a bell or visual indicator is also mounted at the cap, and is activated upon detection of water by the water responsive means.

In a preferred embodiment of the invention, the water responsive means may comprise a pair of conductive probes extending into a space encompassed by the threaded open end of the caplike structure. Upon water bridging the gap between the said probes, means disposed in a suitable circuit with the probes, are switched on to activate the alarm. Such means may comprise a transistorized or other non-latching switch, or may comprise electomechanical or electrical latches. The advantage of the latter arrangement is that the latch, for example an SCR, upon being fired by bridging of the spacing between the probes due to the presence of water, activates the alarm indicator, which then remains in its activated condition until the latch is reset. This insures that an incipient condition will be detected, since once the alarm is tripped, indication will continue to be present until the proprietor turns the alarm off.

In an alternate embodiment of the device, a suitably proportioned and shaped float may extend from the caplike structure into the sewer conduit opening. In this case, displacement of the float due to rising water levels in the conduit, causes movement of an arm carrying the float, to in turn activate a suitable switch, turning on the alarm indicator.

The cap structure is formed of any suitable materials, including plastics or the like, and includes an polygonal-shaped portion, enabling ready manipulation by the usual wrenches found in the home. In one embodiment of the device, hook means may be removably secured to the body of the assembly, enabling its use in other water detecting environments, such as one where the device is mounted to a sink or a tub.

BRIEF DESCRIPTION OF DRAWINGS

The invention is diagramatically illustrated, by way of example, in the drawings appended hereto, in which.

DESCRIPTION OF PREFERRED EMBODIMENT

Figure 1:
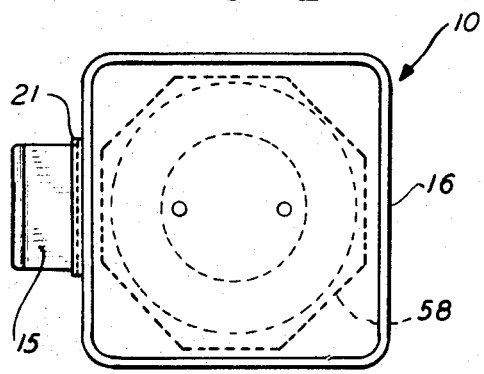
FIGS. 1 and 2 are respectively top plan and side elevational views of an alarm assembly in accordance with the present invention.
Figure 2:
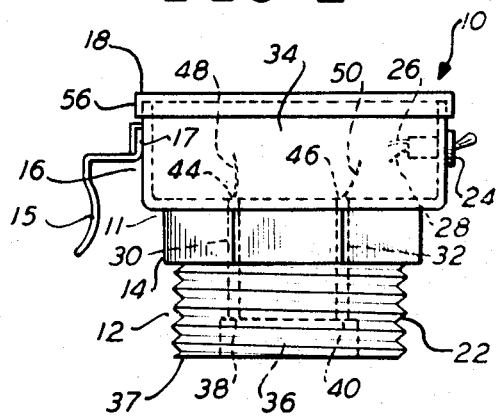

In FIGS. 1 and 2, top plan and side elevational views, respectively appear, of an alarm assembly 10 in accordance with the present invention. The assembly 10 is seen to be a cap-like structure including generally a body portion 11 and a cap 18 frictionally engaging the open upper end of the body portion. Body portion 11 may be formed as a one-piece unit, as for example of a molded PVC plastic or the like, but can be regarded as including three sections. Specifically, body 11 includes a bottom cylindrical portion 12, joined to a polygonally shaped section 14, as for example in the form of an octagon or hexagon, and a hollow case section 16 overlying the section 14.

In the embodiment shown in FIGS. 1 and 2, cylindrical portion 12 is provided externally with threads 22 adapted to mate with corresponding threads formed in the conventional opening provided at a sewer conduit outlet for the purpose of receiving a conventional cleanout plug. The plumbing arrangement referred to, that is a cleanout plug and receiving opening, is a standard and conventional one in dwellings and other buildings. In the usual home, for example, such cleanout plug is usually found at the point in the basement, garage or so forth, whereat the various water outlet pipes connect to the sewer conduit connecting in turn these various outlet pipes to the city sewer, septic tank or so forth. In a typical instance, for example, the threads 22 may comprise a standard 3-inch pipe thread.

Portion 12 is seen to be provided with an open water receiving space 36 at the bottom end thereof, that is at the end of structure 10 which faces inwardly toward the sewer conduit when the structure 10 is emplaced via the threads 22 at the opening of the said conduit. In some instances a venting passage, not explicitly shown herein, may be provided between water receiving space 36 and atmosphere. Such vent permits equalization of pressure in space 36 in those instances where the arrangement of structure 10 in the conduit is such that water may rise in a directly vertical fashion into space 36. Generally, however, such a vent is not required in that water entering space 36 is generally not formed into a well-defined rising surface.

Extending from the hollow space 34 defined within casing section 16, and to water receiving space 36, is a pair of conductive probes 30 and 32, formed for example of metal or other conductive material. The probes are shown terminating in tips 38 and 40 which are exposed to the water receiving space, and are approximately flush with wall 42 bordering space 36. However the probes may also extend somewhat beyond the wall 42 and into the said space 36. The upper ends 44 and 46 of probes 30 and 32 are seen to be provided with a pair of wire connections 48 and 50 extending into casing space 34. The said wires and the associated probes form part of the operative alarm circuit of the present assembly, in conjunction further with a toggle switch 24 mounted at the side wall 52 of the casing section 16. The switch 24 is similarly provided with a pair of wires 26 and 28 enabling the various circuit connections. For purposes of clarity, the several electrical components utilized in the said circuit are not shown in FIGS. 1 and 2, but are all contained within the space 34. The cap 18 previously referred to closes the top of section 16, turned down portion 56 of cap 18 being frictionally engaged with wall 52.

The polygonal section 14 previously referred to between sections 12 and 16, serves the function of enabling tightening and loosening of the structure 10 during the threading emplacement or removal of the structure from the conduit opening. That is, to say, the flat sides 58 defining the periphery of section 14 provide surfaces upon which standard wrenches may be brought to bear for loosening or tightening the structure 10. It will be noted that except for the probes 30 and 32 which are press fitted or threaded into openings extending between spaces 34 and 36, no passageway is present into space 34, such as would permit water to enter. Accordingly, the electrical components contained therein, which typically, as will hereinafter be set forth, include a battery, can in no way be affected in their function by the presence of water.

Figure 3:
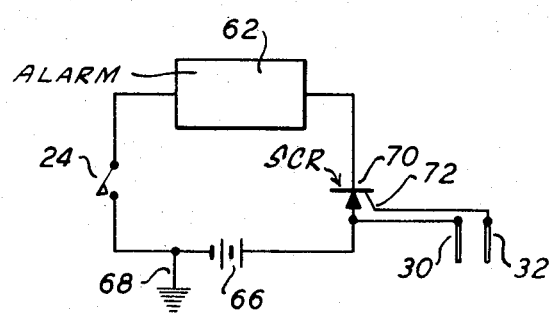
FIG. 3 is a simplified electrical schematic diagram setting forth a suitable circuit for use with the device of FIGS. 1 and 2.

FIG. 3 sets forth a simplified electrical schematic diagram illustrating an electrical circuit utilizable in the present device. An alarm device 62, which may constitute a bell, buzzer or other audible signal, or a visual signal such as a light bulb, a flasher or so forth, is connected in series with one side of a power source in the form of a battery 66, through a normally open switching means, viz. SCR 70. The opposite side of battery 66 is grounded at 68. Switch 24, previously referred to, is in series with device 62 and serves by grounding one side of device 62 to enable the alarm circuit.

SCR 70 is seen to have the pair of conductive probes 30, 32 connected across the gate circuit thereof whereupon should a bridging occur between the said probes due to the presence of water, current is injected into the said gate circuit. Depending upon the bias conditions to SCR 70 this can result in simple non-latched activation of device 62, but assuming, as is usually desirable, that the bias and injected current are sufficient the SCR is fired to full latched conduction, whereupon the device 62 will continue to indicate an alarm condition irrespective of the presence of water between the probes — until the circuit is reset by opening of switch 24.

The latching arrangement described is advantageous in that a transient or incipient condition of blockage, such as will cause water in the sewer conduit to back up or otherwise impinge upon the pair of probes may be detected even though such condition does not persist. This allows the proprietor to become aware of said condition before a serious and permanent backup condition develops. It should be appreciated in connection with FIG. 3 that the SCR illustrated is merely exemplary of one of numerous devices which may achieve the desired latch-on condition in the circuit. Simple electro-mechanical latches, as for example, a resetable relay can be similarly employed to achieve the same effect.

While the device of FIGS. 1 and 2 is particularly adapted for employment in a sewer conduit, according to a further feature of the invention, means are provided for converting device 10 to an effective overflow alarm for use at tub or sink basins or so forth. In particular a receiving flange 21 is provided on one side of casing 16. Flange 21 is open at its underside, whereby the groove 19 thereby exposed may receive tongue 17 of a hook means 15. The said hook is of a flexible plastic and tongue 17 is frictionally retained in groove 19, whereby hook means 15 may be removably secured to casing 16. When the hook is thus secured, device 10 may be suspended by such hook so that the device rests upon the edge of a basin with space 36 above the normally desired water level in the basin. Should the water level now rise substantially above the desired level, it will enter space 36 and activate the alarm device 62. The convertability of device 10 in the manner set forth enables a user by purchase of a single device to have a structure utilizable for several differing purposes.

In this same connection, another feature of the device 10 may be appreciated by noting that the bottom edge 37 of portion 12 is a flat coplanar surface. Because of this it will be evident that device 10 may, if desired, be utilized as a floor or basement water detector —by simply placing the said device upon the surface to be monitored, whereby the device is stably rested upon the edge 37. Should water seep onto the monitored surface and rise within space 36, the alarm device is again activated in the manner previously set forth.

Figure 4:
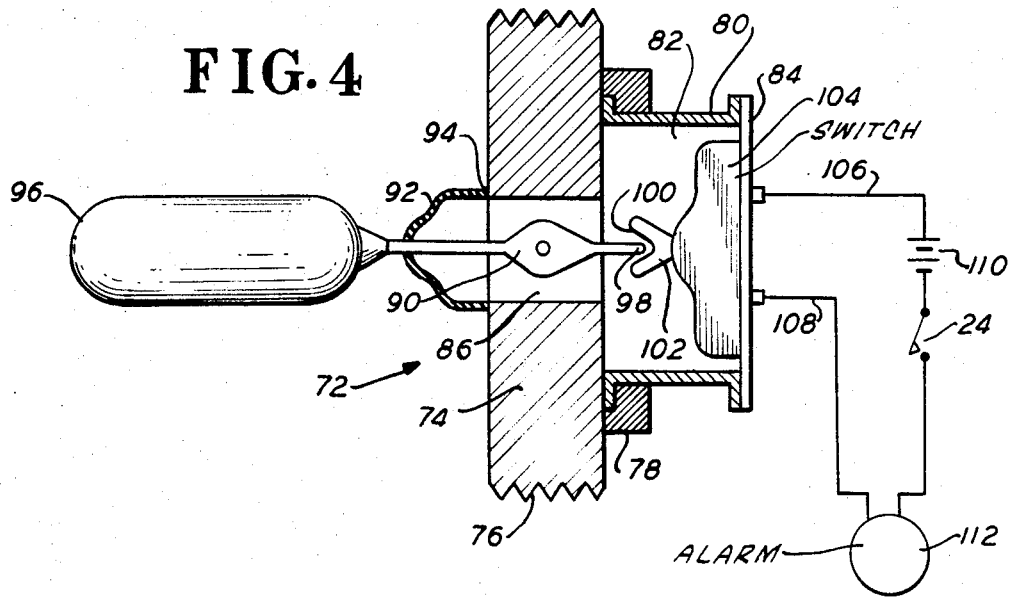
FIG. 4 is a cross-sectional, somewhat schematic view, through an embodiment of the alarm assembly of the present invention, wherein a float and arm arrangement is used to activate the alarm.

In FIG. 4 herein, a cross-sectional, somewhat schematic view appears through an alternate embodiment of an alarm assembly in accordance with the invention. The structure 72 seen therein includes a body portion 74 provided with threads 76, the purpose of which corresponds to that described in connection with threads 22 of FIG. 2. In continuing analogy to the embodiments of FIGS. 1 and 2, it is seen that structure 72 includes a polygonal portion 78 adjoining portion 74, portion 78 being once again in the form of an octagon, hexagon or so forth so as to accomadate a wrench at the outer periphery thereof. Polygonal portion 78 surrounds and joins a casing section 80, which includes a casing space 82 and is closed at the upper end thereof by a cover element 84 which may be fastened to portion 80 by fasteners passing through adjacent flanges or which may be frictionally engaged to portion 80.

The threaded bottom portion 74 is seen to have a central opening 86 passing therethrough. An arm 90 is pivotally mounted at 88 on an axis perpendicular to the plane of the drawing and affixed to portion 74 at the inner edges of opening 86. Arm 90 passes at the left side of the figure through a flexible seal 92, as for example of rubber, neoprene, plastic or the like, the periphery of which at 94 is sealed about the edge of opening 86. The arm externally attaches to an elongated float 96 which may comprise a hollow metallic body, a plastic foam or the like. Toward the right of pivot 88, the arm 90 terminates in a cam-like portion 98 which engages a cam surface 100 defined at the operating member 102 for a simple switch 104. Switch 104 is in series with a pair of conductors 106 and 108 extending from the said switch to a circuit which includes the battery 110 and enabling switch 24.

In the foregoing description of structure 72, the alarm device 112, the battery 110, switch 24 and so forth, are shown for purposes of simplicity as external to casing space 82. In practice, however, these several components may be contained within the said space —as was described in connection with the FIGS. 1 and 2 embodiments.

In connection with both the device set forth in FIG. 4 and that of FIGS. 1 and 2, it should be appreciated that while it is generally more convenient and also safer to provide the device with a self-contained battery as set forth in the figures, it is also within the province of the invention to provide for the device to be powered via line power, that is at 110 to 120 volts, which is stepped down by a suitable transformer to the 9 to 12 volts D.C. preferably utilized in the circuits set forth. For such purposes the stepdown transformer may constitute a separate unit which is external of the alarm assemblies shown and which provides power to the assembly via a standard connector which, for example in the case of FIGS. 1 and 2 may be provided in the casing wall 52. In a less desirable arrangement from a safety viewpoint, but one that is also effective, the stepdown transformer may be incorporated into space 34 of the FIG. 2 embodiment or space 82 of the FIG. 4 embodiment.

The operation of the FIG. 4 embodiment should be readily apparent. In particular, the structure 72 is threaded within the opening provided in the sewer conduit upon removal of the conventional cleanout plug. When such is effected, the float 96 extends inwardly into the said conduit. It will be apparent that the structure 72 is intended for replacement of a cleanout plug where the axis of the ensuing opening is other than completely vertical ( which will usually be the case ). Under such conditions, when the structure 72 is thus installed, the axis of arm 86 carrying float 96 extends in a direction making an oblique angle with respect to a horizontal line. Accordingly, should the water level rise, due to blockage or so forth in the conduit into which the said float extends, clearly float 96 will rise, in consequence of which cam surface 98 moves downwardly thereby bearing against cam surface 100 to displace operating member 102. This in turn effects closing of switch 104 and activation of the alarm device 112, assuming that switch 24 has previously been placed in a closed position. While the circuit depicted in connection with structure 72 does not specifically incorporate a latching device, such as a relay or the SCR shown in FIG. 4, it is obviously within the province of the invention for the closure of switch 104 to activate a resetable relay or trigger an SCR so that the alarm device contained in series with such a latch would continue to provide an alarm indication notwithstanding the return of float 96 to a normal position.

While the present invention has been particularly described in terms of specific embodiments thereof, it will be understood in view of the instant disclosure that numerous variations upon the invention are now enabled to those skilled in the art, which variations yet reside within the scope of the instant teaching. Accordingly, the invention is to be broadly construed, and limited only by the scope and spirit of the claims now appended hereto.

I claim:

1. An alarm assembly for replacing a cleanout plug in a sewer outlet conduit, comprising in combination:
    a caplike structure for replacing said cleanout plug, said structure carrying external threads adapted to mate with the threads of the cleanout opening in the sewer conduit, said structure including a lower cylindrical portion bearing said threads, a water receiving space for receiving water rising in said conduit toward said cleanout opening, and an upper hollow casing portion;

water responsive means mounted in said structure including a pair of conductive probes extending from the space within said casing portion to the water receiving space of said lower cylindrical portion;

an alarm indicator means mounted at said caplike structure and disposed in an electrical alarm circuit in said upper hollow casing portion, said probes being disposed in said alarm circuit so that bridging of the probes by water entering said receiving space activates said alarm indicator; the said electrical circuit including said alarm indicator, a source of e.m.f. for powering said alarm indicator, an on/off switch in series with said alarm indicator and e.m.f. source, and a switching means activated by bridging of said conductive probes in series with said alarm indicator and e.m.f. source, for activating said alarm upon occurrence of bridging of said probes due to the presence of water; said switching means comprising a resetable latch, whereby the activation of said alarm due to the presence of water maintains said alarm in a position indicating condition until the resetting of said latch.

2. A device according to claim 1, wherein said structure includes means for securing hook means at a side thereof, whereby said device may be converted for suspension in a basin to act therein as an overflow alarm.

3. A device in accordance with claim 1 wherein said caplike structure further includes a portion intermediate said casing and cylindrical portions, the periphery of which bears flat faces, thereby enabling a wrench to be brought to bear upon said portion for loosening or tightening the said cap at the conduit cleanout opening.

4. A device in accordance with claim 1 wherein said latch comprises an SCR.

* * * * *

UNITED STATES PATENT OFFICE
CERTIFICATE OF CORRECTION

Patent No. 3,757,316        Dated Sept. 4, 1973

Inventor(s) Joseph Fiorenzo

It is certified that error appears in the above-identified patent and that said Letters Patent are hereby corrected as shown below:

Following claim 4, i.e. following column 8, line 19, add the following claim:

--5. A water responsive alarm circuit comprising in combination:
    an alarm device;
    a source of E.M.F. in series with said alarm device;
    an enabling switch connected in series with said source of the E.M.F. and alarm device;
    a normally non-conducting SCR connected in series with said alarm device, enabling switch and E.M.F. source, the anode of said SCR being connected to the positive side of said E.M.F. source and the cathode of said SCR being connected to the ground side of said circuit; and
    a pair of spaced conductive probes connected across the gate-anode circuit of said SCR, whereby when said circuit is enabled by closure of said enabling switch and said probe pair is bridged by water therebetween, the said SCR is fired to activate said alarm device.

Signed and sealed this 18th day of December 1973.

(SEAL)
Attest:

EDWARD M. FLETCHER, JR.    RENE D. TEGTMEYER
Attesting Officer    Acting Commissioner of Patents